Jan. 19, 1937.  F. S. PROTHERO ET AL  2,068,038
INTERNAL COMBUSTION ENGINE
Filed Aug. 16, 1933  6 Sheets-Sheet 1
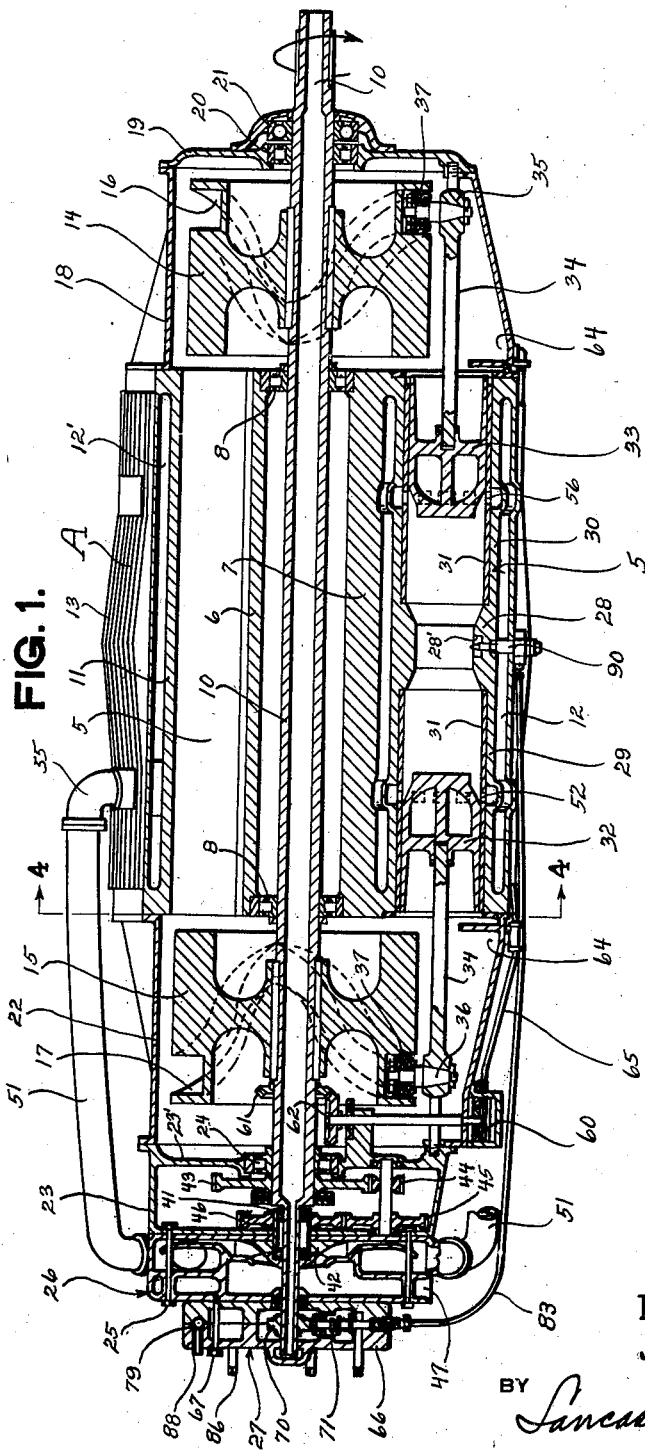
INVENTORS
Floyd S. Prothero
John B. Parsons
BY Lancaster, Allwine and Rommel
ATTORNEYS.

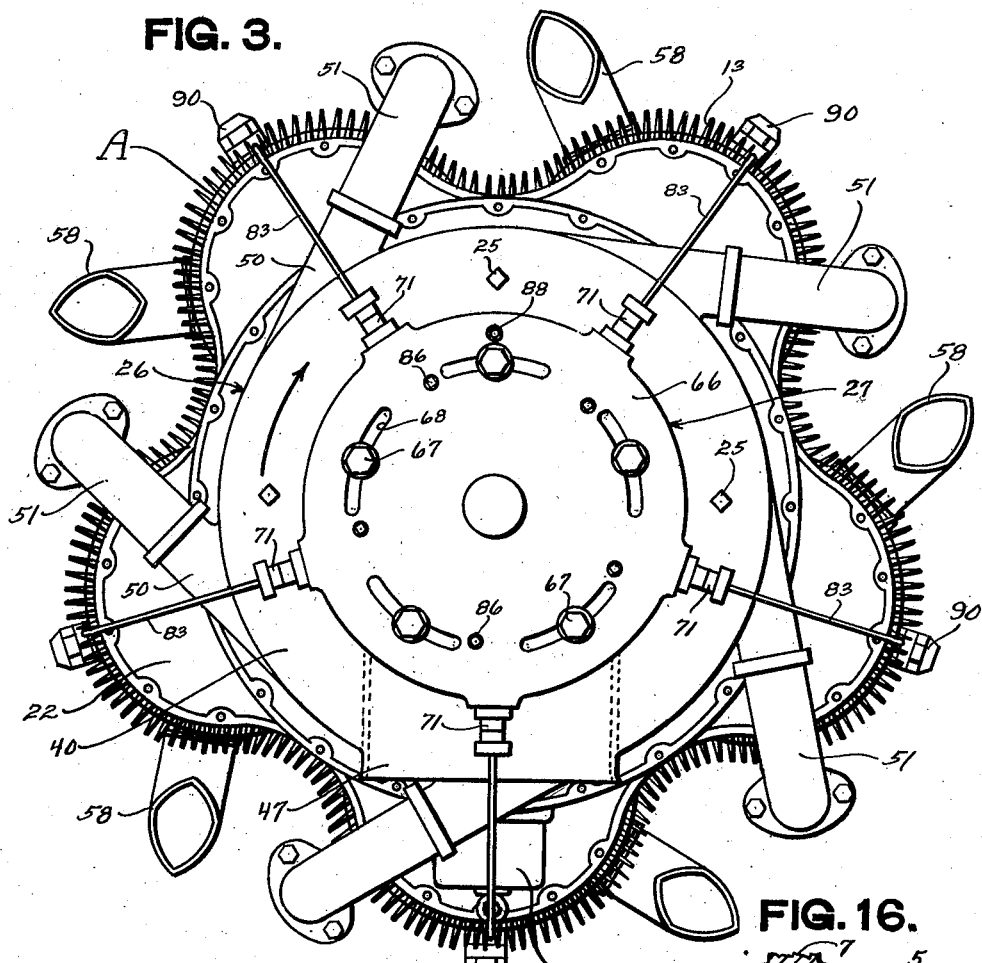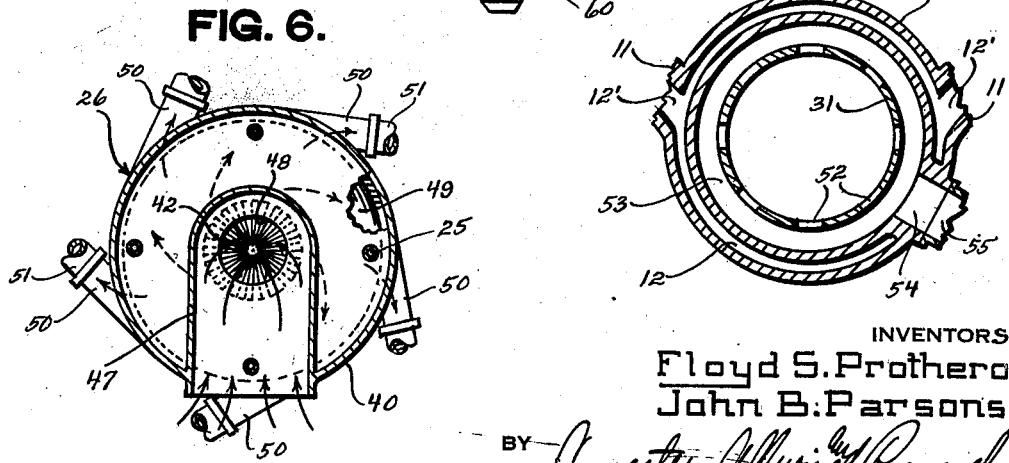

Jan. 19, 1937.  F. S. PROTHERO ET AL  2,068,038
INTERNAL COMBUSTION ENGINE
Filed Aug. 16, 1933   6 Sheets-Sheet 3

INVENTORS
Floyd S. Prothero
John B. Parsons
BY
Lancaster, Allwine & Rommel
ATTORNEYS.

Jan. 19, 1937.  F. S. PROTHERO ET AL  2,068,038
INTERNAL COMBUSTION ENGINE
Filed Aug. 16, 1933  6 Sheets-Sheet 4

INVENTORS
Floyd S. Prothero
John B. Parsons
BY
Lancaster, Allwine & Rommel
ATTORNEYS.

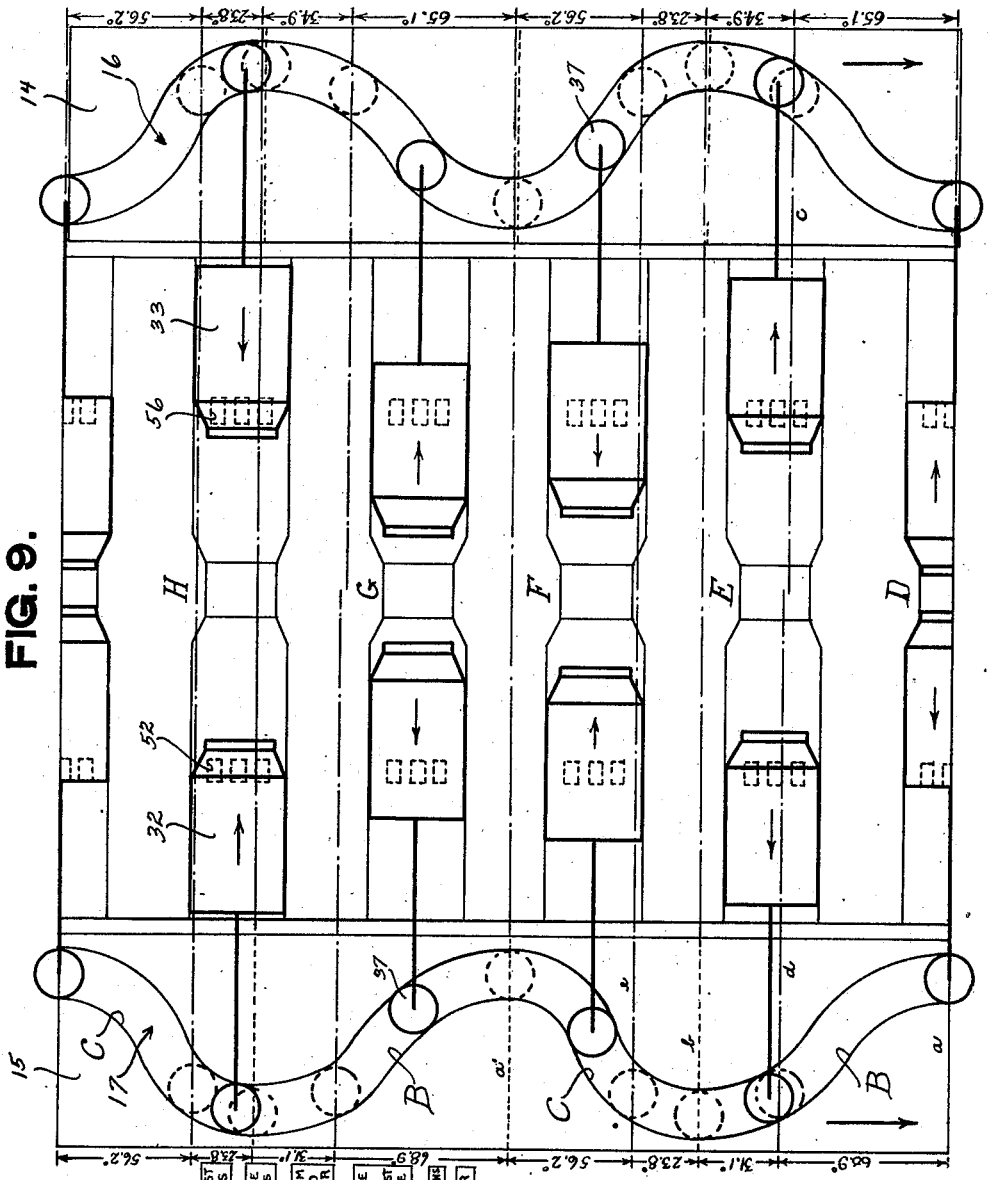

Jan. 19, 1937.  F. S. PROTHERO ET AL  2,068,038
INTERNAL COMBUSTION ENGINE
Filed Aug. 16, 1933  6 Sheets-Sheet 6
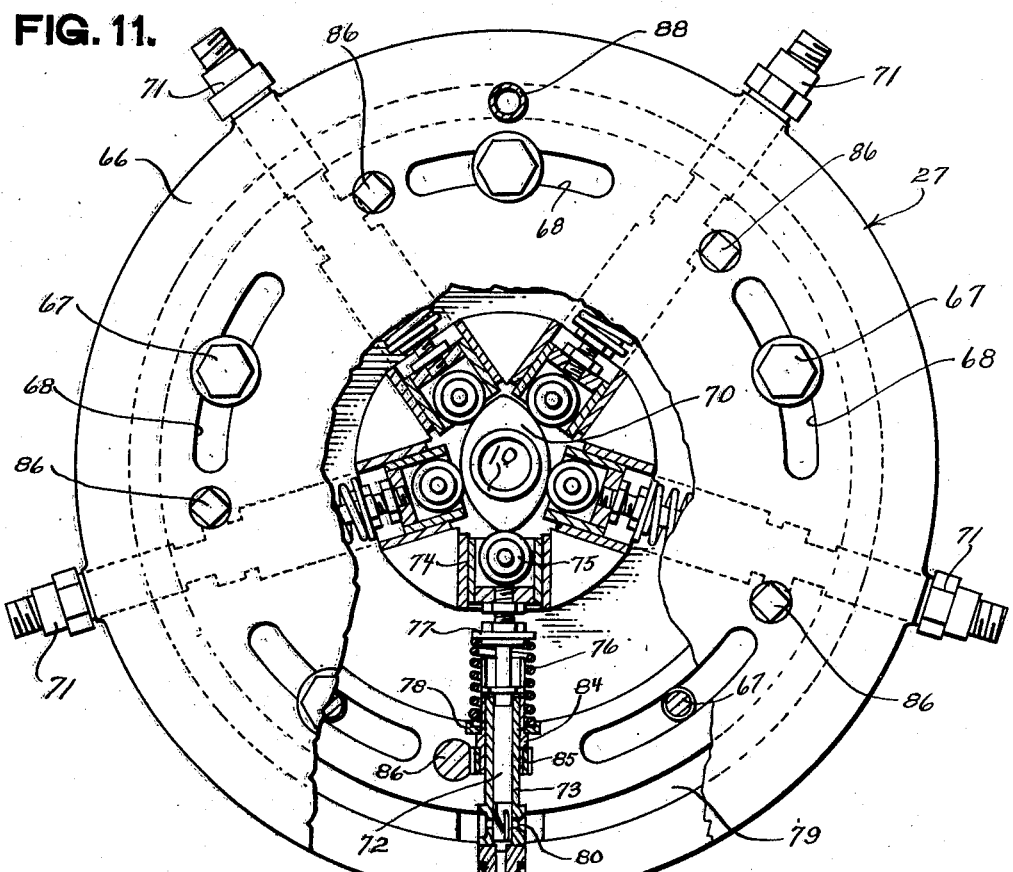
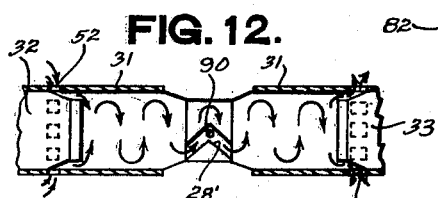
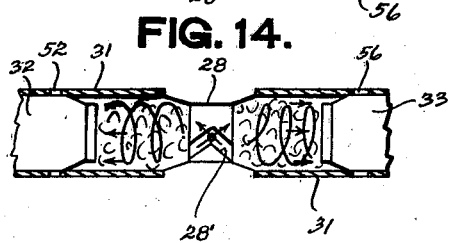
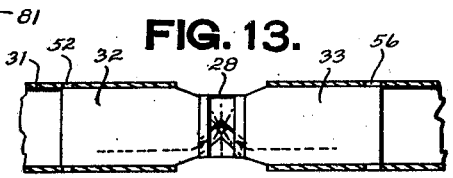
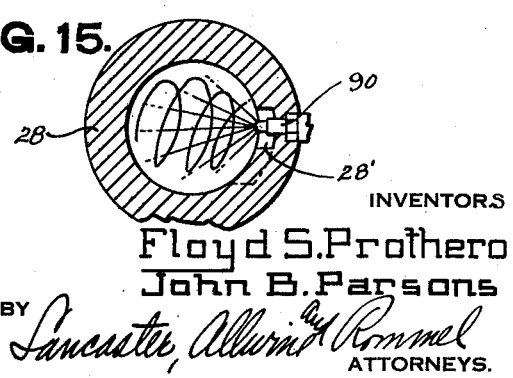

Patented Jan. 19, 1937

2,068,038

UNITED STATES PATENT OFFICE 2,068,038

INTERNAL COMBUSTION ENGINE

Floyd S. Prothero, West Hartford, Conn., and John B. Parsons, Arlington, Mass.

Application August 16, 1933, Serial No. 685,436

14 Claims. (Cl. 123—51)

The present invention relates to internal combustion engines and the primary object of the invention is to provide an internal combustion engine of the compression-ignition type operating on a dual two cycle principle.

A further object of the invention is to provide an internal combustion engine of the Diesel type which will be extremely light in weight comparable to power output, and operating on the opposed piston two cycle principle.

A further object resides in the provision of an improved form of internal combustion engine of this character which, while not limited to such, is especially well adapted for use as an aviation engine due to its small frontal area resulting in low wind resistance; minimum vibration whereby the weight of the mounting brackets for the engine may be decreased; reduction of fire hazards thru utilization of a heavy fuel oil which is relatively non-inflammable; increased flying range due to low fuel consumption; and reliability due to the elimination of complex ignition and fuel systems, valves and operating mechanisms therefor, etc.

A further object is to provide an internal combustion engine of this character wherein the pistons are grouped about a propeller shaft for movement in directions parallel thereto, with a novel arrangement of fuel delivering means for the cylinders.

A further object of the invention is to provide an internal combustion engine of the Diesel type wherein the power stroke is of longer duration than the compression stroke.

A further object of the invention is to provide an internal combustion engine of the opposed piston, two cycle type wherein the pistons make two complete cycles for each revolution of the propeller shaft.

A still further object of the invention is to provide an internal combustion engine of the compression-ignition type operating on the opposed piston, two cycle principle, having an improved scavenging arrangement for expelling burned gases from the cylinders.

A still further object of the invention is to provide an improved type of fuel pump unit for multi-cylindered engines of the Diesel type.

A still further object of the invention is to provide an internal combustion engine of the Diesel type wherein the pistons are grouped about a propeller shaft for movement in directions parallel to the shaft, and with the fuel pump unit and blower or supercharger unit arranged co-axially of the shaft at one end thereof.

Other objects and advantages of the invention will be apparent from the following detailed description, taken in connection with the accompanying drawings, forming a part of this specification and in which drawings:—

Figure 1 is a central longitudinal section thru the engine, with the two pistons shown, at the end of the expansion and power strokes of these pistons.

Figure 2 is a fragmentary longitudinal section thru one of the cylinders and showing the opposed pistons at their inward limit of movement on the compression stroke.

Figure 3 is an enlarged view looking at the rear end of the engine.

Figure 6 is a sectional view thru the blower or supercharger unit.

Figure 9 is a diagrammatic view showing the cycle of piston operation, with the cam drums and cylinder block laid out in flat projection.

Figure 10 is a timing diagram for the engine.

Figure 11 is an enlarged detail view part in elevation and partly broken away of the fuel pump unit and showing the manner in which the fuel pumps are grouped radially about the operating cam.

Figure 12 is a somewhat diagrammatic view showing the pistons in their outward limit of movement and the passage of the scavenging air thru the cylinder.

Figure 13 is a somewhat diagrammatic view showing the pistons at their inward limit of movement or top center.

Figure 14 is a somewhat diagrammatic view showing the pistons on their power stroke.

Figure 15 is a fragmentary section thru one of the cylinders at the combustion chamber.

Figure 16 is an enlarged fragmentary transverse section thru one of the cylinders at the scavenging air intake.

Figure 4:
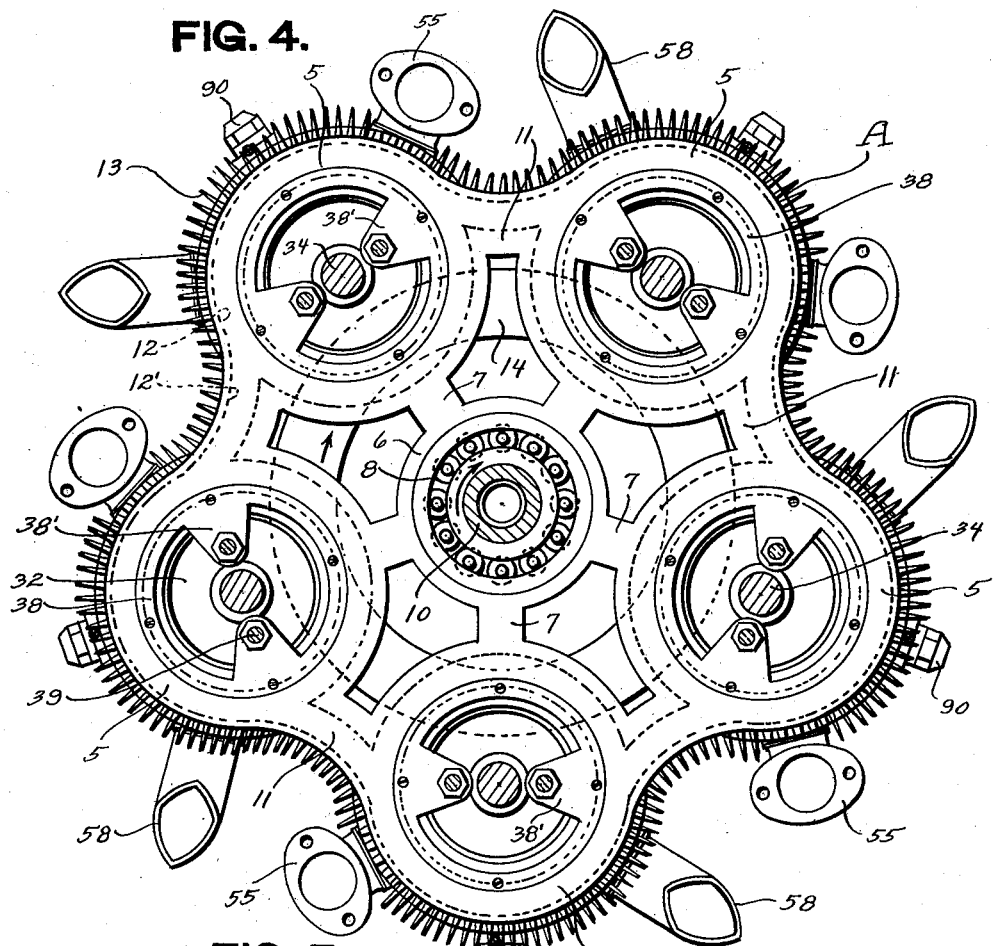
Figure 4 is an enlarged transverse section substantially on the line 4—4 of Figure 1 and looking in the direction of the arrows.
Figure 7:
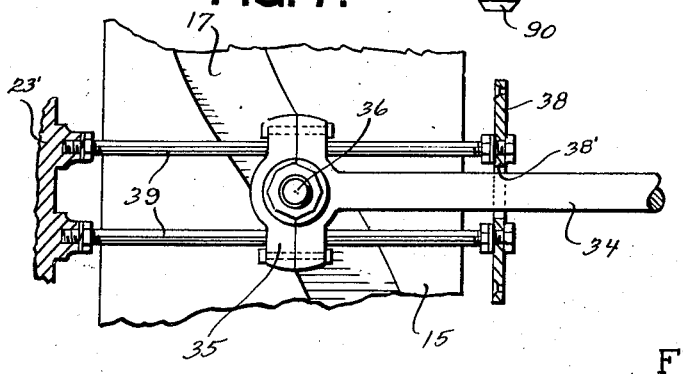
Figure 7 is an enlarged fragmentary detail view showing a portion of one of the cam wheels or drums and the guide rods for the piston rods.
Figure 5:
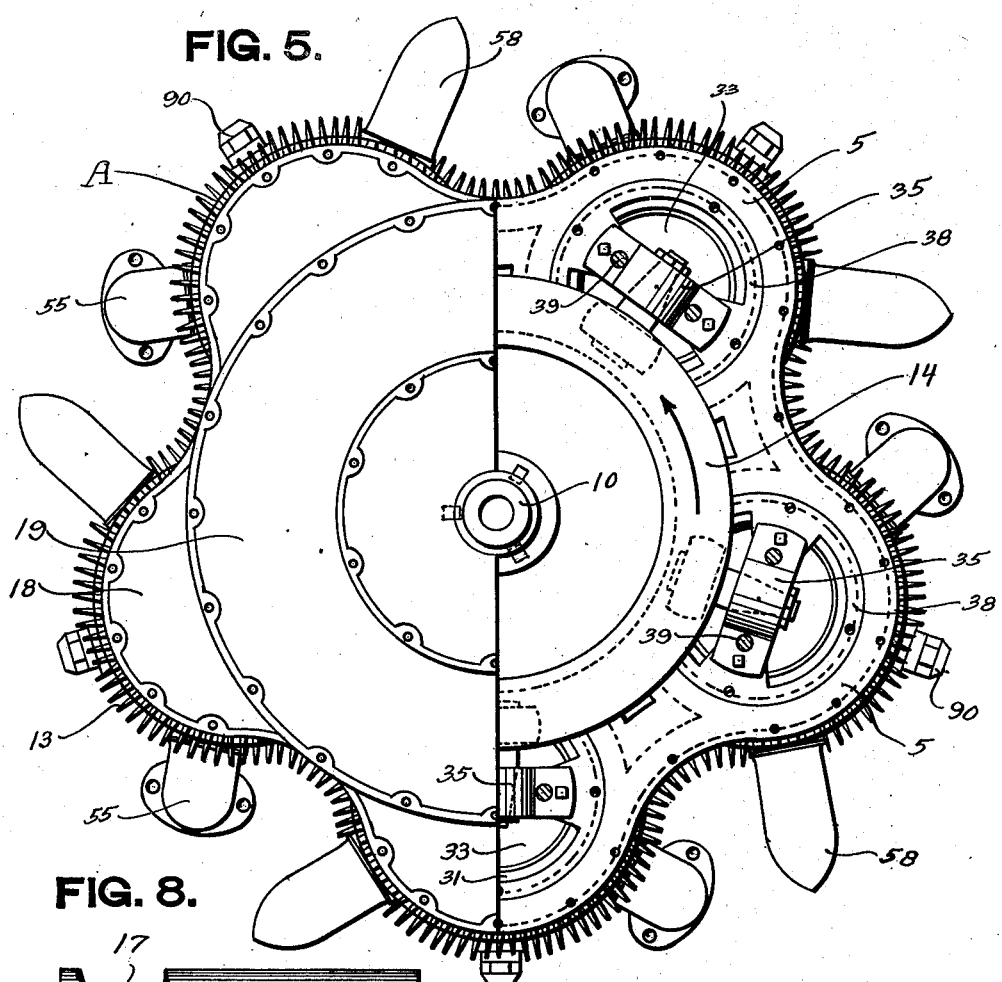
Figure 5 is a front end view of the engine showing portions of the front engine housings broken away.

Referring to the drawings in detail and wherein similar reference characters designate corresponding parts thruout the several views, the engine has been shown provided with five cylinders, altho the engine may be built with any desired number of cylinders. The engine comprises a cylinder block A which in the example shown is formed with a series of five cylinders 5 arranged in parallel relation and in annular formation about a tubular hub portion 6 with which the cylinders are connected by webs 7 extended thruout the length of the cylinders. The cylinders 5 as shown in Figure 1 extend thruout the full length of the cylinder block. Journaled to extend axially thru the hub portion 6 as upon radial anti-friction bearings 8 arranged at each end of the hub portion, is a tubular propeller shaft 10 which projects beyond each end of the cylinder block. The cylinders 5 are also joined by outer webs 11 extended longitudinally thruout the length of the cylinders. Encircling each cylinder is a cooling chamber 12 which extends substantially thruout the entire length of the cylinders and these cooling chambers are connected with one another by cooling channels 12' formed in the outer webs 11. The cylinders are thus encircled by a cooling chamber adapted to contain any suitable cooling liquid. The exterior of the cylinder block is longitudinally finned as at 13, and the permanent cooling fluid surrounding the cylinders serves to conduct the high temperatures to these external cooling fins.

Rigidly affixed to the propeller shaft 10 just forwardly of the cylinder block A is a front cam wheel or drum 14, while rigidly affixed to the propeller shaft just rearwardly of the cylinder block is a rear cam wheel or drum 15 and these cam wheels have a diameter slightly less than the diameter of a circle passing thru the axis of the annularly arranged cylinders 5. Formed in the circumferential surface of the front cam drum 14 is a continuous cam groove 16, while formed in the circumferential surface of the rear cam drum 15 is a continuous cam groove 17 which is similar to the cam groove 16 except that the cam grooves are in reverse relation to one another, with respect to the cylinder block. The specific formation of these cam grooves 16 and 17 will be subsequently described.

Secured to the forward end of the cylinder block A is a front cam housing 18 enclosing the front cam drum 14, and secured to the forward end of this cam housing 18 is a front end plate or disc 19 serving to close the front end of the housing 18. The tubular propeller shaft 10 projects thru and is journaled in the front end plate 19 by means of a radial and a thrust bearing 20 and 21 respectively. Secured to the rear end of the cylinder block A and enclosing the rear cam drum 15 is a rear cam housing 22 to the rear end of which is secured a shallow gear housing 23, the front wall 23' of which forms a closure for the rear end of the housing 22. The hollow propeller shaft 10 projects axially thru this wall 23' and is rotatable therein by means of a radial anti-friction bearing 24.

Secured as by bolts 25 to the rear wall of the gear housing 23 is a blower or supercharger unit 26, while adjustably secured to the blower unit 26 is a fuel pump unit 27. It will be noted in Figure 1 that the rear end of the propeller shaft 10 extends thru both of the units 26 and 27.

The cylinders 5 are each formed midway of their ends with an intermediate or combustion chamber portion 28, to the rear of which is provided a rear or scavenging cylinder portion 29, and forwardly of which is provided a front or exhaust cylinder portion 30. These terminal or working cylinder portions 29 and 30 are each provided with a liner 31 which extend to the combustion chamber portion 28. The combustion chamber portion 28 is of less internal diameter than the cylinder portions 29 and 30 whereby the annular wall thereof has proportionately more metal than the cylinder portions 29 and 30 for the purpose of retaining sufficient heat for combustion, the prevention of too rapid cooling of the combustion chamber portion, and to accommodate high pressures. As will be noted in Figure 1, the ends of the combustion chamber portion 28 flare conically to the cylinder portions 29 and 30.

Reciprocally removable in the rear cylinder portion 29 is a rear or scavenging piston 32, while reciprocally movable in the cylinder portion 30 is a front or exhaust piston 33. Connected to each piston is a piston rod 34 which projects beyond the open end of the cylinders and are provided at their outer ends with a cross head 35 in which are mounted bearing pins 36 which extend at a right angle to the piston rod 34. Mounted by means of an anti-friction bearing upon the bearing pin of each cross head is a cam roller 37 for working in the cam grooves of the cam drums 14 and 15.

Secured to each end of the cylinder block A at each end of the cylinders 5 is a guide rod plate 38 of ring-like formation and having inwardly projecting lugs 38' as shown in Figure 4. Secured at one end to the lugs 38' of each plate 38 is a pair of guide rods 39 which extend parallel to the line of movement of the pistons and upon which the cross heads 35 are slidably guided. These guide rods for the rear pistons 32 may have their outer ends secured to the gear housing 23, while the guide rods for the pistons 33 may have their outer ends secured to the front end plate 19. This manner of guiding the piston rods eliminates all side thrust and torque of the cam rollers in their cam grooves and also eliminates side wall thrust of the pistons in the cylinders.

Referring now to the construction and manner of operating the blower or supercharger 26, the same is driven from the drive shaft 10 thru suitable gearing whereby the impeller of the unit operates at many times the speed of the drive or engine shaft. The shaft 10 where it extends thru the units 26 and 27 is reduced in diameter preferably at a point within the gear housing 23 as clearly shown in Figure 1. The unit 26 comprises a cylindrical casing 40 which is rigidly secured to the gear housing 23 by the bolts 25. Rotatably mounted upon the reduced portion of the shaft 10 as by suitable anti-friction bearings with one end projecting into the housing 23 and the opposite end projecting axially into the casing 40 is a sleeve 41 providing an impeller shaft for mounting of an impeller 42 within the casing 40. Rigidly mounted upon the shaft 10 is a driving gear 43 which meshes with a pinion 44 fixed upon a shaft carrying an intermediate gear 45 and which latter gear meshes with a gear 46 fixed upon the sleeve 41. Extending radially into the forward portion of the casing 40 is an air intake 47 having a circular opening 48 as shown in Figure 6 arranged axially of the casing, at the axis of the impeller 42. The air drawn thru the opening 48 by the impeller 42 is directed radially by a diffuser plate 49 into tangentially arranged air outlets 50, one of which is provided for each cylinder of the engine. Connected with each of the outlets 50 is an air transfer pipe 51.

The liner 31 of the cylinder portion 29 of each cylinder 5 is provided substantially midway its ends with a scavenging air intake port 52 consisting of a series of ports and these ports communicate with an annular air chamber 53 formed in the cylinder portion. Each of these annular air chambers 53 communicates thru the passage 54 shown in Figure 16 with a scavenging air intake 55 to each of which is connected one of the air transfer pipes 51. Thus it will be seen that the scavenging air from the blower or supercharger unit 26 is delivered into the rear or scavenging cylinder portions 29 thru the intake ports 52 when the pistons 32 are at their outward limit of movement as shown in Figure 1. Reciprocatory movement of the pistons 32 serves to open and close the ports 52.

The liners 31 of the front or exhaust cylinder portions 30 of each cylinder 5 are provided substantially midway their ends with an exhaust port in the form of a series of ports 56 to be opened and closed upon reciprocatory movement of the pistons 33. These exhaust ports 56 communicate with an annular exhaust 57 formed in each of the cylinder portions 30, and each of these annular chambers 57 communicates with an exhaust stack 58 by passageways traversing the cooling chambers 12. The exhaust ports 56 are of slightly greater length longitudinally of the cylinder than the air intake ports 52, with that end of the ports farthest remote from the center of the cylinders spaced an equal distance from the center of the cylinders as shown more clearly in Figure 9. With the specific arrangement of the intake ports 52 and the exhaust ports 56 it will be observed that the scavenging air will have a unidirectional flow thru the cylinders for completely scavenging the cylinders of burned gases.

The engine may be lubricated by means of an oil pump 60 shown in Figure 1 arranged beneath the rear cam housing 22 and driven by bevel gears 61 and 62, the gear 61 being keyed to the engine shaft 10 and the gear 62 being fixed to a shaft 63 connected to the pump. Oil sumps 64 are provided in the lower portions of the housings 18 and 22 and an oil line 65 connects these sumps with the pump 60. The pump 60 may deliver the oil to suitably arranged feed lines which extend to portions of the engine to be lubricated.

Referring now to the fuel pump unit 27 which is arranged at the rear of the blower unit 26, the same comprises a substantially flat disc-like casing 66 which in the example shown is divided circumferentially into two sections. This casing 66 is secured to the blower unit casing 40 axially of the engine shaft 10 by means of timing lock nuts 67 extended thru arcuate slots 68 formed concentric to the axis of the casing 66. Loosening of the lock nuts 67 will permit rotation of the casing 66 so that timing of the engine will be retarded or advanced as to the time of fuel injection into the cylinders 5. The reduced rear end portion of the engine shaft 10 projects axially thru the pump unit casing 66 and has mounted thereon within the casing, a two lobed actuating cam 70 having the lobes arranged at 180° apart.

Grouped radially about the cam 70 is a series of fuel injection pumps 71 of a standard construction as now being used upon compression ignition engines of the Diesel type. These fuel injection pumps 71 are of the spring loaded, cam actuated type and each embodies a plunger 72 operating in a barrel 73 fixed in the casing 66. Secured to the inner end of the plunger 72 is a guide 74 carrying a roller 75 to be engaged by the cam 70. The plunger 72 and roller 75 are normally spring urged toward the cam 70 by the plunger spring 76 acting between a spring plate 77 fixed to the plunger 72 and a spring plate 78 bearing against the casing 66. The plunger 72 moves with a constant stroke in the barrel 73 and acts to deliver a measured quantity of fuel to the cylinder with which the engine is connected.

The pump casing 66 is provided with an annular fuel chamber 79 thru which the outer portions of the barrels 73 project and small ports 80 permit fuel to be drawn into the barrels by the pump plungers. As the pump plunger 72 is moved inwardly by the spring 76 on its suction stroke, fuel is drawn thru the ports 80 into the barrel 73. On the delivery stroke of the plunger, the fuel in the pump barrel is forced thru a spring seated discharge valve 81 enclosed in the fuel discharge coupling 82 into a fuel delivery line 83. A fuel delivery line 83 is provided for each of the fuel injection pumps 71 and extend one to each of the cylinders 5.

The pump plunger 72 has an end formation to enable the pump to vary the quantity of fuel delivered at each stroke, and means is provided for increasing or decreasing the quantity of fuel delivered thru rotation of the plunger 72. This means for rotating the pump plunger embodies a control sleeve 84 rotatably encircling the barrel 73 and having fixed thereon a toothed quadrant 85 which meshes with a rack provided on a control rod 86. These control rods 86 for the fuel injection pumps project rearwardly to the casing 66 for connection with any suitable form of control "not shown" whereby the control rods may be operated simultaneously for varying the quantity of fuel delivered by the fuel injection pumps. Thus, the speed of the engine is controlled by varying the stroke of the plungers in the fuel injection pumps, and timing of the fuel injection into the cylinders is obtained thru rotating the casing 66.

Fuel is delivered from a suitable supply, preferably by gravity, thru a fuel inlet 88 into the fuel chamber 79 whereby the fuel chamber is at all times flooded with fuel which may be readily drawn into the pump barrels of the various pumps thru the ports 80.

The fuel delivery lines 83 extend forwardly from the fuel pump unit and are each connected to a fuel injector nozzle 90 one of which projects into the combustion chamber portion 28 of each of the cylinders 5. Thus the fuel is injected under high pressure into the engine cylinders.

While the engine has been shown constructed with five cylinders, the design of the engine is not confined to five cylinders but may be constructed with any desired number of cylinders arranged in suitably spaced relation about the engine shaft. Referring particularly to Figure 11, showing five fuel injection pumps 71 grouped radially about the two lobed cam 70, this cam is designed to operate all five of the pumps at the desired firing order. In Figure 11 it will be noted that when one lobe of the cam 70 is in a position actuating one of the fuel injection pumps, that the oppositely disposed lobe occupies an idling space between two adjacent fuel pumps. As the cam 70 rotates from the position shown in Figure 11, the opposite, or upper lobe will actuate one of the injection pumps while the lower lobe will move to an idling space between two adjacent pumps. With this arrangement of actuating the radially arranged fuel injection pumps by a cam arranged at the center of the pumps, fuel will be injected alternately into the cylinders 5 whereby, in connection with a five cylinder engine as shown, the firing order would be 1, 3, 5, 2, 4. As before stated, rotary adjustment of the fuel pump unit 27 allows for advancing or retarding of the timing of the fuel injection and this rotary adjustment may cause slight yielding of the fuel delivery lines 83.

Referring particularly to Figures 12 to 15 inclusive, Figure 12 shows the pistons 32 and 33 at their opposed or outward limit of movement, and by arrows shows the unidirectional flow of scavenging air thru the cylinder from the intake port 52 to the exhaust port 56 for thoroughly removing the burned gases from the cylinder. Formed in the inner surface of the combustion chamber portion 28 is a V-shaped channel 28' into the apex of which the injector nozzle 90 projects for spraying the fuel in a fan-shaped manner into the highly turbulent air currents created by inward movement of the pistons toward one another. As the pistons enter the combustion chamber 28, the air entrapped therebetween is forced thru the legs of the channel 28' at a converging angle thus causing a thorough intermixing of the fuel and air.

Referring particularly to Figure 10, it will be noted that the expansion or power strokes are of longer duration than the compression strokes and that there are two complete cycles of operation of the pistons to one complete revolution of the engine shaft. It will also be observed in this timing diagram that the exhaust opens in advance of the intake during the expansion stroke and that the intake and exhaust close simultaneously during the compression stroke. It is to be understood however, that the timing diagram shown in Figure 10 is merely illustrative and may vary as to the length of compression and expansion strokes, as well as the closing time of the intake and exhaust ports. It is desired however, that the expansion or power stroke be of longer duration than the compression stroke for a purpose to be subsequently set forth.

Figure 8:
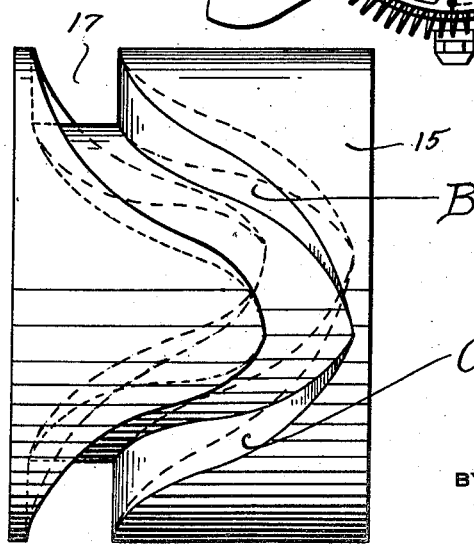
Figure 8 is an enlarged side elevation of one of the cam wheels or drums.

In operation of the engine, the positions of the pistons 32 and 33 as shown in Figure 1 are that of being at their outermost positions of movement at the end of the expansion and power strokes and ready to begin the compression stroke. With this outward or power movement of the pistons the cam rollers 37 working in the power curve portions of their respective cam grooves will rotate the cam drums 14 and 15 in a counter clockwise direction, viewing the engine from the forward end. With the cam drums rotating in a counter clockwise direction, the pistons are moved inwardly from the bottom or outer dead center at the same speed thru movement of the cam rollers in the compression curve portions C of the cam grooves to top or inner dead center to the positions shown in Figure 2 and as shown in position D in Figure 9. As clearly shown in Figures 8 and 9, the power curve portions B are longer than the compression curve portions C. With the pistons in the bottom or outer dead center position as shown in Figure 1, it will be seen that both the intake and exhaust ports 52 and 56 respectively are uncovered so that scavenging air under pressure is transmitted from the blower unit 26 thru the air transfer pipe 51 into the annular air chamber 53, thru the intake ports 52, thru the length of the cylinder and out thru the exhaust ports 56. It will here be noted that only air is used for scavenging and fuel economy is thereby affected.

As the cam rollers continue movement in the cam grooves the pistons move inwardly closing the intake and exhaust ports thereby trapping fresh air in the cylinders between the pistons. As the cam rollers approach the peak of the compression curve or the position of top dead center as at position F in Figure 9, the entrapped air is increased in pressure until the temperature becomes hot enough for the ignition of fuel when sprayed into the cylinder. At a proper time before the pistons reach their maximum inward movement or top dead center, fuel under pressure is inserted into the combustion chamber portion thru the fuel injector nozzle 90 from one of the fuel injection pumps 71 actuated by the cam 70. The fuel being injected into this highly compressed rapidly moving hot air, ignites and expansion takes place in a constant pressure manner. The pistons therefore, start their movement away from each other in opposite directions at the same speed and over the same distance, causing the cam rollers 37 to move in the power curve portions B of the cam grooves in an outward motion and thus transmitting the expanded energy of the explosion between the piston heads, thru the piston rods 34 to the cam rollers 37 thus rotating the cam drums and the engine shaft 10. Thus one cycle is completed, involving two strokes, but only one-half of the available "crank angle", or one-half of one revolution or 180°.

Referring particularly now to Figure 9 which illustrates five cylinders with their two cam drums 14 and 15 laid out in flat projection, it will be seen that the five cylinders are equally spaced at 72° apart for annular formation about the engine shaft. At the right or front end of the cylinders is the cam drum 14 while at the left or to the rear of the cylinders is the cam drum 15 with the cam groove 16 and 17 respectively. The cam rollers 37 are placed in the same relation as the cylinders due to their being affixed to the piston rods and pistons. In observing the pitch line of the cam grooves, it will be seen that an operating cycle utilizes only one-half of the length of the cam grooves inasmuch as there are two inward and two outward peaks of each groove thus effecting two power strokes and two compression strokes in the completion of travel of the cam rollers in the grooves 16 and 17. From Figure 9 it will further be noted that the power and compression portions of the cam grooves are unequal, the former being 100° as indicated between the lines "a" and "b", said lines respectively designating top or inner dead center and bottom or outer dead center, and the latter being 80° as indicated between the lines "b" and "a'". Thus the compression curve portions of the cam grooves will be deeper than the power curve portions of the grooves causing faster inward movement of the pistons than outward movement of the pistons. The faster the compression stroke takes place over the same distance of piston travel, the more heat will be generated, and the slower the power stroke over the same distance of piston travel, the more effectively will the energy be transmitted. Consequently, in the completion of one cycle, the compression stroke in relation to the power stroke is 8:10 so that the completed cycle is therefore 180° or one-half revolution of the cam drums. The cycle is again duplicated in the second 180°, or second one-half revolution of the cam drums, thus obtaining two power strokes for one revolution of the engine shaft, resulting in a dual two cycle principle of operation.

The cam drums 14 and 15 while being identical, the cam drum 14 (exhaust control cam drum) is set behind the cam drum 15 (scavenging or intake control cam drum) for a slight degree of crank angle to effect a difference in opening of the exhaust and intake ports and simultaneous closing of both the intake and exhaust ports. With this arrangement as shown at "c" in Figure 9, the exhaust port opens at 34.9 degrees before bottom dead center while the intake or scavenging port opens at 31.1 degrees before bottom dead center as indicated by the line "d". This opening of the exhaust in advance of the intake provides more time for the exhaust gases in the cylinder to be reduced to atmospheric pressure before the scavenging air is admitted, and reduces back pressure on the blower unit. As indicated by the line "e", the intake and exhaust ports are closed simultaneously by their respective pistons for entrapping fresh scavenging air within the cylinder.

The position E in Figure 9 shows the pistons just after opening the intake and exhaust ports with the cam rollers moving outwardly in the power or expansion curve portions C of the cam grooves. The position F shows the pistons moving inwardly with the cam rollers moving in the compression curve portions C of the cam grooves. The position G shows the pistons moving outwardly with their cam rollers moving in the power curve portions of the cam grooves, while the position H shows the pistons just starting on their inward movement from the bottom dead center position.

It will be noted that while the intake and exhaust ports are relatively small in comparison to the length of the cylinders, the exhaust ports will remain open for a period of 58.7 degrees of crank angle, while the intake port will remain open for a period of 54.9 degrees of crank angle even tho the intake ports are shorter than the exhaust ports. This provides for complete and thorough scavenging of the cylinders and insures entrapping of a fresh supply of air between the pistons. It is to be understood that the specific timing as shown may vary and is not limited to the specific arrangement shown.

It will be seen that the design for cooling involves the use of both an air stream and a liquid coolant. The cooling chamber 12 extends for almost the entire length of the cylinder block and encircles the entire circumference of each cylinder and these cooling chambers are connected by the channels 12' so that a continuous cooling chamber is formed entirely about the engine block. The liquid used in the cooling chamber may be a chemical compound with an extremely large range between zero temperatures and boiling point, the freezing point being considerably lower and the boiling point considerably higher than that of water. The heat of the cylinders is transmitted by the liquid to the exteriorly finned surfaces of the cylinder block and is dissipated by the air stream passing over the fins and well stream lined cylinder block.

Thus it will be seen that an engine of the compression-ignition type has been disclosed embodying improved features of construction whereby the engine while not limited to such use, is especially well adapted for aviation use because of its stream lined features having the blower or supercharger and the fuel pump units arranged axially of the engine block about which the cylinders are arranged in annular formation parallel to the shaft. It will also be seen that a fuel pump unit of improved construction has been disclosed permitting timed actuation of a series of fuel injection pumps arranged in radial relation about a single operating cam.

For military or aeronautical purposes, rapid gun fire will be possible with the form of engine herein shown without requiring use of heavy and accurately timed synchronized gearing, due to the fact that the engine propeller shaft is of straight tubular formation permitting firing of machine gun and small shells thru the engine shaft.

Changes in detail may be made to the form of invention herein shown and described, without departing from the spirit of the invention or the scope of the following claims.

We claim:
1. In an internal combustion engine, a cylinder, a pair of pistons reciprocable in the cylinder, intake ports in the cylinder controlled by one of the pistons, exhaust ports in the cylinder controlled by the other piston, and means associated with the pistons for effecting opening of the exhaust ports in advance of opening of the intake ports upon the expansion stroke of the pistons and simultaneous closing of both the intake and exhaust ports upon compression movement of the pistons.

2. In an internal combustion engine, a cylinder having intake ports adjacent one end and exhaust ports adjacent its opposite end, a pair of pistons reciprocable in opposed relation in the cylinder for controlling the ports, and cam means causing faster travel of the pistons on the compression stroke than on the expansion stroke, said cam means causing one of the pistons to open the exhaust ports in advance of opening of the intake ports by the companion piston and causing simultaneous closing of both the intake and exhaust ports by the pistons.

3. In an internal combustion engine, a cylinder having spaced apart intake and exhaust ports, a pair of pistons movable in the cylinder, a shaft journalled parallel to the cylinder, a drum fixed on the shaft at each end of the cylinder and each having a continuous cam groove in its annular surface providing two compression curve portions and two expansion curve portions, and means connected to the pistons and operating in the cam grooves for imparting one revolution to the shaft upon two cycles of movement of the pistons, said cam grooves having a contour causing opening of the exhaust ports by one of the pistons in advance of opening of the intake ports by the other piston, and providing a power stroke of longer duration than the compression stroke.

4. In an internal combustion engine, a cylinder having exhaust ports adjacent one end and intake ports adjacent its opposite end, a pair of pistons movable in the cylinder and each controlling one of said ports, a shaft journalled parallel to the cylinder, a drum fixed on the shaft at each end of the cylinder and each having a continuous cam groove in its annular surface providing two compression curve portions and two expansion curve portions, means connected to the pistons and operating in the cam grooves of their respective drums for imparting one revolution to the shaft upon two cycles of movement of the pistons, the drum having connection with the piston for controlling the exhaust ports being set on the shaft behind the other drum for causing opening of the exhaust ports in advance of opening of the intake ports, said ports being of different lengths and the contour of the cam grooves being such as to cause simultaneous closing of the intake and exhaust ports by their respective pistons, scavenging means for the cylinder, and fuel injection means for the cylinder.

5. In an internal combustion engine, a cylinder block having a plurality of parallel arranged cylinders disposed in circular relation, a pair of pistons movable in each cylinder, a shaft journalled in the cylinder block parallel with the cylinders, drive means between the pistons and shaft for imparting rotation to the shaft upon reciprocation of the pistons, a blower mounted axially of one end of the cylinder block and driven by the shaft for delivering scavenging air into the cylinders, and a fuel pump mounted axially of the cylinder block and embodying a series of fuel injection pumps driven by said shaft for delivering fuel in a timed relation into the cylinders between the pistons therein.

6. In an internal combustion engine, a cylinder block having a plurality of parallel disposed cylinders arranged in annular relation, a shaft journalled in the cylinder block parallel to the cylinders and projecting beyond opposite ends of the cylinder block, a pair of pistons movable in each cylinder, a cam drum fixed on the shaft beyond each end of the cylinder block, drive coupling means between the pistons and cam drum for imparting rotation to the latter upon reciprocation of the former, a blower unit mounted axially of one end of the cylinder block and driven by said shaft, and a fuel pump unit mounted axially of the blower and embodying radially arranged induction pumps operated by said shaft for timed injection of fuel into the cylinders.

7. In an internal combustion engine, a cylinder block having a plurality of parallel disposed cylinders arranged in annular relation, a shaft journalled in the cylinder block parallel to the cylinders and projecting beyond opposite ends of the block, a pair of pistons movable in each cylinder, motion transmitting means between the pistons and shaft, a blower mounted at one end of the cylinder block and embodying an impeller driven by said shaft, a fuel pump unit embodying a series of fuel injection pumps arranged radially of said shaft, and a cam on the shaft for timed actuation of the fuel injection pumps.

8. In an internal combustion engine, a cylinder block having a plurality of parallel disposed cylinders arranged in annular relation, a shaft journalled in the cylinder block parallel to the cylinders and projecting beyond opposite ends of the cylinder block, a pair of pistons movable in each cylinder, drive means between the pistons and shaft for imparting rotary movement to the shaft upon reciprocatory movement of the pistons, a blower mounted axially of the shaft and embodying an impeller, spur gearing between the shaft and impeller, a fuel pump unit axially of the shaft and embodying radially arranged fuel injection pumps, and a two lobed cam on the shaft for alternately actuating the pump to provide alternate operation of the cylinders.

9. In an internal combustion engine, a cylinder block having a plurality of parallel disposed cylinders arranged in annular relation, a shaft journalled in the cylinder block parallel to the cylinders and projecting beyond opposite ends of the block, a pair of pistons movable in each cylinder, a cam drum fixed on the shaft beyond each end of the cylinder block, drive coupling means between the pistons and cam drums, a blower unit mounted axially of one end of the cylinder block and through which said shaft projects, drive means between the shaft and blower, a fuel pump unit mounted axially of the shaft and embodying radially arranged injection pumps, a single cam on the shaft for actuating the pumps, and rotary adjusting means for the fuel pump unit for varying the timing of the injection pumps.

10. In an internal combustion engine, a cylinder block of substantially annular formation, an engine shaft journalled axially in the block, a blower unit mounted axially of one end of the cylinder block, and a fuel pump unit mounted axially of the blower unit, said units each having the shaft projecting therethrough and connected for operating the units.

11. In an internal combustion engine, a cylinder block having a plurality of parallel disposed cylinders arranged in annular relation, a shaft journalled in the cylinder block parallel to the cylinders and projecting beyond opposite ends of the block, a pair of pistons movable in each cylinder, a cam drum fixed on the shaft beyond each end of the cylinder block, drive coupling means between the pistons and drums, a housing enclosing each of said drums, a gear housing secured to one of the cam housings, a blower secured to the gear housing, and a fuel pump unit secured to the blower, said fuel pump unit, blower and cylinder block being arranged in axial alignment concentrically of said shaft.

12. In an internal combustion engine, a cylinder block having a plurality of parallel disposed cylinders arranged in annular relation, a shaft journalled in the cylinder block parallel to the cylinders and projecting beyond opposite ends of the cylinder block, a pair of pistons movable in each of the cylinders, a front cam drum fixed on the shaft at the forward end of the cylinder block, a rear cam drum fixed on the shaft at the rear end of the cylinder block, a cam housing for the front cam drum, a rear cam housing for the rear cam drum, drive coupling means between the pistons and drums, a gear housing secured to the rear cam housing, a blower unit secured to the gear housing and embodying an impeller, drive gearing in the gear housing for driving the impeller from said shaft, a fuel pump unit secured to the blower and embodying a series of radially arranged fuel injection pumps one for each of the cylinders, said shaft projecting axially into the fuel pump unit, and a cam on the shaft for actuating the fuel injection pumps.

13. In an internal combustion engine, a cylinder block having a plurality of parallel disposed cylinders, a shaft journalled parallel to the cylinders, a pair of pistons movable in each cylinder, means for imparting reciprocatory movement of the pistons into continuous rotary movement of the shaft, a blower for delivering scavenging air into the cylinders, and a fuel pump unit for delivering fuel into the cylinders embodying a casing mounted concentrically of said shaft, rotary adjustment means for the casing, a series of radially arranged fuel injection pumps mounted in the casing, and a cam on the shaft for alternately actuating the pumps.

14. In an internal combustion engine, a cylinder block having a plurality of parallel disposed cylinders arranged in annular relation, a straight tubular engine shaft journalled axially of the block parallel to the cylinders, a supercharger unit mounted axially of one end of the block, and a fuel pump unit mounted axially of the block, said engine shaft projecting through both of said units.

FLOYD S. PROTHERO.
JOHN B. PARSONS.